(12) United States Patent
Aguiar et al.

(10) Patent No.: US 11,443,616 B2
(45) Date of Patent: Sep. 13, 2022

(54) METHOD AND SYSTEM FOR DETERMINING RISK AREAS IN ROAD TRAFFIC

(71) Applicant: CooDriver GmbH, Grünwald (DE)

(72) Inventors: Ana Aguiar, Oporto (PT); Walter Hildebrandt, Grünwald (DE)

(73) Assignee: CooDriver GmbH, Grünwald (DE)

( * ) Notice: Subject to any disclaimer, the term of this patent is extended or adjusted under 35 U.S.C. 154(b) by 716 days.

(21) Appl. No.: 16/306,783

(22) PCT Filed: Jun. 6, 2017

(86) PCT No.: PCT/DE2017/100476
§ 371 (c)(1),
(2) Date: May 24, 2019

(87) PCT Pub. No.: WO2017/206998
PCT Pub. Date: Dec. 7, 2017

(65) Prior Publication Data
US 2019/0272746 A1    Sep. 5, 2019

(30) Foreign Application Priority Data
Jun. 3, 2016 (DE) .................. 10 2016 110 331.4

(51) Int. Cl.
*G08G 1/01* (2006.01)
*G08G 1/065* (2006.01)
*G08G 1/015* (2006.01)
*G08G 1/052* (2006.01)
*H04W 4/40* (2018.01)
*H04W 4/021* (2018.01)

(52) U.S. Cl.
CPC .......... *G08G 1/0133* (2013.01); *G08G 1/012* (2013.01); *G08G 1/015* (2013.01); *G08G 1/0129* (2013.01); *G08G 1/052* (2013.01); *G08G 1/065* (2013.01); *H04W 4/40* (2018.02); *H04W 4/021* (2013.01)

(58) Field of Classification Search
CPC .... G08G 1/0133; G08G 1/012; G08G 1/0129; G08G 1/015; G08G 1/052; G08G 1/065; H04W 4/40; H04W 4/021
See application file for complete search history.

(56) References Cited

U.S. PATENT DOCUMENTS

| 2013/0179027 A1* | 7/2013 | Mitchell | G07C 5/085 701/29.3 |
|---|---|---|---|
| 2013/0211706 A1* | 8/2013 | MacNaughtan | H04W 88/00 701/410 |
| 2013/0226651 A1* | 8/2013 | Napper | G06Q 20/12 701/527 |
| 2013/0285855 A1* | 10/2013 | Dupray | G01S 19/48 342/451 |

(Continued)

*Primary Examiner* — Peter D Nolan
*Assistant Examiner* — Wae L Louie
(74) *Attorney, Agent, or Firm* — Jonathan M. D'Silva; MMI Intellectual Property

(57) ABSTRACT

A method, comprising: receiving position data from a mobile device; incrementing a counter variable, said counter variable associated with a predefined geographic area that includes a position of the position data, and initializing a time variable, said time variable set to a predefined value and decremented continuously; and decrementing said counter variable in response to expiration of said time variable.

7 Claims, 3 Drawing Sheets

(56) References Cited

U.S. PATENT DOCUMENTS

| | | | | |
|---|---|---|---|---|
| 2015/0081162 A1* | 3/2015 | Mitchell | ................ | G06Q 10/06 |
| | | | | 701/32.4 |
| 2015/0081399 A1* | 3/2015 | Mitchell | .................. | G08G 1/20 |
| | | | | 705/7.38 |
| 2015/0120174 A1* | 4/2015 | Lewis | .................. | G08G 1/0129 |
| | | | | 701/118 |

* cited by examiner

METHOD AND SYSTEM FOR DETERMINING RISK AREAS IN ROAD TRAFFIC

The present patent application relates to methods and systems for determining critical areas in road traffic.

In public space, in particular in road traffic, traffic situations continually arise that expose road users to dangers.

An increasing number of road users own mobile devices that are adapted to acquire data about their position. These mobile devices may be smart phones or stationary devices in vehicles, and communicate via wireless networks. Such devices may determine position data via GPS, via network assisted location or via other measures.

So-called geo-fences are known that may be configured by a user of a mobile device to detect other users as these enter or leave a space that is bounded by such geo-fences. A geo-fence represents a bounded space that may be configured by use of a digital map, for example.

The problem underlying the present invention is making road users visible to others. In particular, navigation systems or assistance systems shall be informed about road users, such as in order to enable them to adapt to a current traffic situation.

A first embodiment of the invention comprises a method, comprising receiving position data from a mobile device; incrementing a counter variable associated with a predefined geographic area that includes a position of the position data, and initializing a time variable, said time variable set to a predefined value and decremented continually; and decrementing the counter variable in response to expiration of said time variable.

According to one particular embodiment, the method further comprises receiving information on a type of means of transportation associated with the mobile device, said incrementing a counter variable further comprising incrementing a counter variable for said type.

Preferably, the method further comprises receiving a request from a second mobile device and transferring one or more counter variables in a predefined geographic area that includes the position of the second mobile device.

In particular, the method may include an embodiment wherein the predefined value is an expected value defining an average length of stay of the mobile device in the predetermined geographic area for a type of means of transportation, said type associated with the mobile device.

Further embodiments comprise a system, comprising one or more mobile devices; and a server; wherein the server is adapted to receive position data from the one or more mobile devices, to increment a counter variable associated with a predefined geographic area that includes a position of the position data, and to initialize a time variable, said time variable set to a predefined value and decremented continually, said server further adapted to decrement said counter variable in response to expiration of said time variable.

Preferably, the server is further adapted to store in a data structure one or more counter variables and time variables for each geographic area that includes a received position.

In particular, the server may be adapted to receive information on types of means of transportation associated with the mobile devices, wherein incrementing a counter variable further comprises incrementing a respective counter variable for the type of means of transportation.

According to one particular embodiment, the server is further adapted to receive a request from a mobile device and to determine one or more counter variables in a predefined geographic area that includes the position of the mobile device.

Preferably, the predefined value is an expected value that defines an average length of stay of a mobile device in the predefined geographic area for a type of means of transportation.

An inventive step is established in particular by combining multiple counters associated with respective geographic areas. By maintaining a counter variable for each predefined geographic area and a separate time variable for each road user in this area, a data structure is generated that may be analyzed conveniently and efficiently for safety-related locations. In addition to a quick and directed analysis, embodiments of the invention also serve as a warning system that is capable of warning road users, navigation systems, or assistance systems with reduced computational cost against particular traffic situations, and thereby increases road-safety. In particular, the invention maintains anonymity of the road users, as these are not identified or specifically tracked.

DETAILED DESCRIPTION

Figure 1:
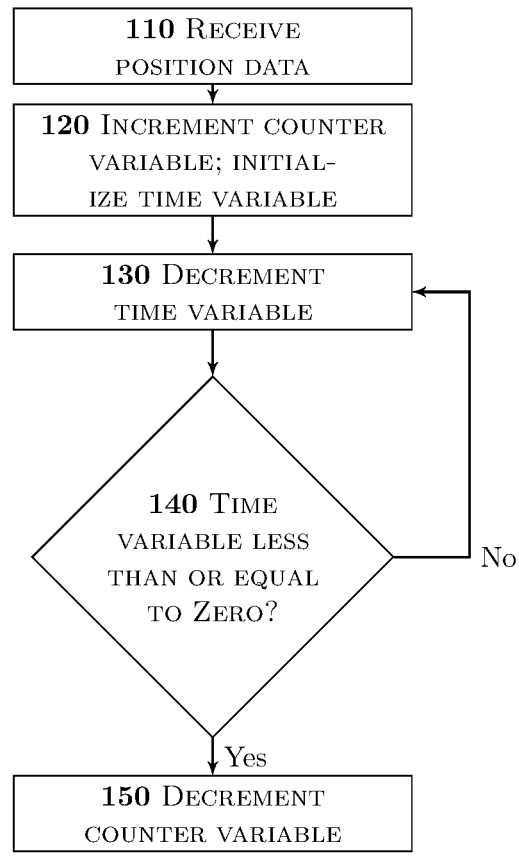
FIG. 1 illustrates a method according to embodiments of the invention.

A first embodiment of the invention comprises receiving geographic position data from a mobile device. The mobile device may be a GPS tracker or a GPS-enabled mobile phone or on-board electronics of a car, a train, tram, or other vehicles that are capable of determining their geographic position and to communicate this to other devices, such as via a wireless connection. The position data may be received from one or more servers. Mobile devices may provide their position data via an app, for example, that is installed on the respective device and that continually acquires positions of the device and sends these to one or more servers.

In response to the receiving of a position at a server, a counter variable is incremented by the same, said counter variable associated with the received position in a first embodiment and associated with a geographic area that includes the position, in a second embodiment.

Such a geographic area may be a rectangular field in a geographic grid. In certain embodiments, the size of such a field corresponds to the precision of the position data such that a field size of loom is used if position data have a precision of loom. However, field sizes may be larger than the position precision.

If no counter variable is associated with the position or, respectively, the area, a new counter variable is defined for this position or the area, respectively, and is incremented. The presence of such a counter variable may be determined based on an appropriate data structure, such as a hash table or a one-dimensional or multi-dimensional array. In the data structure, the positions or, respectively, the areas serve as an index to lookup data associated with these. Such lookup data comprise a counter variable for each position or area, respectively, in an example.

According to one embodiment, the counter variable is incremented by a constant value, such as by the value one. Accordingly, the value of the counter variable represents the number of road users who are present in the acquired area or at the position.

In a particular embodiment, the counter may simply be binary and only defines whether road users are present in the respective area or at the position.

In case a direction and velocity has been transferred along with the position of a participant, a calculation may be made when the participant will have left a predefined radius around the current position or area of the participant, and a determination may be made based on the direction at which position or in which area the participant may be expected to be present then. If the velocity exceeds a predefined threshold, a warning may be provided to those road users that are present in a predefined radius around the expected position or in an area that includes the position. This embodiment may be deployed, for example, for road users in proximity of railroad crossings, wherein road users are warned against an approaching train. Such a warning may be issued by a server that maintains the data structure, such as in response to a request by a mobile device or a navigation system or an assistance system.

In addition to said incrementing the counter variable, a new time variable is defined for this counter variable. This is done independent of whether the counter variable was newly defined or whether a time variable already exists for this counter variable or this position or the corresponding area, respectively. The time variable is initialized with a predefined time value. This time value may be a standard duration of stay of the road user at the transferred position or the particular area, respectively, or may be based on an estimated duration of stay. For example, an average duration of stay may be used for the area or a predefined perimeter of the position, or alternatively a duration of stay that is based on the type of the road user, provided that this information is available. For example, the mobile device may include this type in the transfer. In certain embodiments, a predefined duration of stay may be used for each type of road user, such as a first duration of stay for a car, a second duration of stay for a tram, and a third duration of stay for a pedestrian. In addition or alternatively, the duration of stay may be determined based on a specific location, such as from empirical values of durations of stay for this location. The duration of stay is preferably provided in seconds. The duration of stay may be determined such that a participant will have left a predefined radius around the position of the participant or the area, respectively, within this duration of stay.

In case the velocity of a participant was determined along with the position data, the time variable is set to a time value determined based on the velocity, in one embodiment. At high velocity this time value is shorter than at lower velocity. The time value may be calculated such that the participant has left a predefined radius around the position of the participant or the area that includes the position, respectively, within the time value.

In embodiments with separate counter variables for each participant, a global counter may be provided in addition to the separate counter variables, said global counter counting independent of type. This global counter is incremented or decremented, respectively, independent of the type, as is detailed further below.

Each time a position is received, a new time variable is created for this position or the predefined area that includes this position, as detailed above, and is stored in the data structure at this position or area, respectively. Therefore, multiple time variables may exist for the same position/the same area, and may respectively represent the expected duration of stay for a road user at this position/this area. In case these counter variables are initialized with different durations of stay, these durations of stay are stored in the data structure, as well.

After said creating and initializing of the time variable, this time variable is continually decremented. Preferably, the decrementing is performed in regular time intervals, such as once per second. All time variables are decremented by the time value that has lapsed since the initializing or, respectively, the most recent decrementing.

If a time variable reaches the value zero, the counter variable associated with this time variable is decremented by the value one. Multiple time variables associated with the same time variable result in decrementing the counter variable independently from one another if they respectively reach the value zero. The counter variable thereby models the number of road users who are assumed at the corresponding position or its area, respectively, at a given time.

With the above embodiments, a data structure that includes positions/areas and counter variables, as well as time variables, is continually updated. The data structure hence provides a complete picture of traffic situations for the covered positions or areas. The data structure may therefore be used according to various embodiments of the invention to warn road users. According to further embodiments, the data structure may be used to identify frequently visited or dangerous areas. Warning functionality and identification functionality may be provided automatically in response to an event, or in response to a request, such as a request sent by means of an app to the server.

In a particular embodiment, the first data structure discussed so far may be subjected to an analysis for local and/or global maxima, such as in response to a request by a mobile device to a server. Accordingly, a two-dimensional second data structure, such as an array, may be created for a given time, the dimensions of such an array corresponding to the two spatial dimensions of the position data. Subsequently, each of the fields of the second data structure is set to include the value of the respective counter variable at the corresponding time, wherein one counter variable is provided for each field. Coordinates in the second data structure for which no counter variables exist in the first data structure are set to the value zero. Each field of the data structure corresponds to exactly one position, in a first embodiment. In a second embodiment, each field corresponds to an area that may include multiple positions.

However, the second data structure may reflect other resolutions, as well. In one particular embodiment, the resolution of the second data structure may be determined by defining, for example, a distance in reality that corresponds to a field in the data structure. As a consequence, different positions or areas that are more precise than such a distance are mapped to the same field. For example, a definition may be made that each field corresponds to 50 m in reality. As a consequence, different positions or areas with a precision of several meters may be mapped to the same field, such that a field in x direction for the area of 40 m to 45 m represents different position definitions of 42 m, 40 m, and 43 m.

According to an embodiment, the field with the greatest value is now identified in the second data structure. This coordinate corresponds to the location with the highest traffic load at the corresponding time. This location may be regarded as particularly critical. According to particular embodiments, road users approaching this location may be warned by means of a message to their mobile devices, or navigation systems or assistance systems may be notified automatically or upon request.

As an alternative or in addition to identifying a global maximum, an analysis for local maxima may be conducted on the second data structure. Accordingly, any known algorithm may be used that identifies, by taking account of neighborhoods among the coordinates, those fields in the second data structure which values are greater than those in the respective neighborhood. These local maxima, as well, may be used to warn road users approaching corresponding locations. In a particular embodiment, a determination regarding proximity to one of the identified maxima may be conducted each time position data are received by a mobile device, as detailed above, and a warning may be sent to the corresponding device if the device is within a predefined radius from the maximum. If a direction is specified in addition to the position, the sending of the warning may depend on whether a maximum is in moving direction of the device.

As an alternative or in addition to a maximum analysis, those fields may be identified that exceed a predefined threshold. For example, all fields are determined that include more than N road users of a given type or, alternatively, of any type, or fields with more than M road users exceeding a predefined velocity are determined.

As an alternative to a two-dimensional data structure, a three-dimensional data structure, such as a three-dimensional array, may be used. The third dimension corresponds to time. The three-dimensional array may be created from temporarily stored two-dimensional arrays that were created as detailed above and were stored in regular or arbitrary predefined time intervals. In response to a request to a server, a maximum analysis may be conducted based on the three-dimensional data structure for a given time included in the request, such as a maximum analysis as discussed above. As an alternative, a maximum analysis may be conducted for a complete stored time period. Accordingly, a maximum may be determined for all times included in the three-dimensional data structure, in one particular embodiment. In this case, the invention provides the location where the greatest number of road users was measured in this time period. This may be the single greatest number of road users, or alternatively the greatest sum of all road users observed at a position or in an area over the time period. As an alternative to a global maximum, local maxima may be detected in the three-dimensional data structure, as well. In this case, the invention provides locations, namely positions or areas, where more road users were measured than in the neighborhood of these locations. Again, this may comprise local maxima with regard to a sum of road users over a time period, or a respective greatest number of road users at all acquired times. In one embodiment, the request may include a definition of how to determine maxima. For example, the request may specify that sums of road users over all acquired times are to be compared or that individual numbers of road users at different times are to be compared.

In the following, several embodiments are detailed based on the drawings.

FIG. 1 illustrates a method 100 for determining traffic data. In step 110, position data are received from a mobile device. The data may be received at a server, for example. In a particular embodiment, a determination is made which field of a predefined grid includes a position of this position data. Such a geographic grid may be represented by an appropriate data structure. Subsequently, a determination is made whether a counter variable is already associated with a position of these position data or, respectively, with the field, such as by looking up the position/the field in a data structure. If such a counter variable does not yet exist, it is newly created, and is stored in the data structure at the position or the area, respectively, that is defined by the field. According to certain embodiments that include transferring a type of the road user, such as a car or a tram, a respective counter variable for the position/the area may be stored for each type. In this case, a determination is made whether a counter variable already exists for the specified type at this position or in this area, and a counter variable is newly created, if appropriate.

In step 120, the counter variable associated with the position or the area in the data structure is incremented. In embodiments that involve the type of the road user, only the counter variable that also corresponds to the type of the sender of the position is incremented. The counter variable is incremented by the value one. In addition, a new time variable for the corresponding position or the area is created. This is done even if the position or the area already existed, and even if one or more time variables were stored in the data structure for the position or the area. The time variable is associated with the position or the area, respectively, and is also associated with the counter variable, such as by being stored at the position or the corresponding area, respectively, in the data structure. The time variable is initialized with a duration of stay that corresponds to the duration a road user is expected to stay at the corresponding position or the area, respectively, or within a predefined radius around this position. This value may be determined based on empirical values, such as based on empirical values for this type of road user. In other embodiments, the value may be based on a velocity of the road user if known for the type or if transferred. Alternatively, a standard value may be used.

From this point, the time variable is continually decremented, as is illustrated in step 130. The lapsed duration is subtracted at regular intervals.

At Step 140, a determination is made whether the time variable has reached the value zero. This determination is made regularly before or after each decrementing. If the determination is negative, method 100 continues at step 130.

If the determination is positive, meaning that the time variable is zero, method 100 is continued at step 150. Here, the counter variable associated with the time variable is decremented. A value of one is subtracted from the counter variable to indicate that the road user is unlikely to still be present at this position or the area, respectively, or within a predefined radius around said position.

Figure 2:
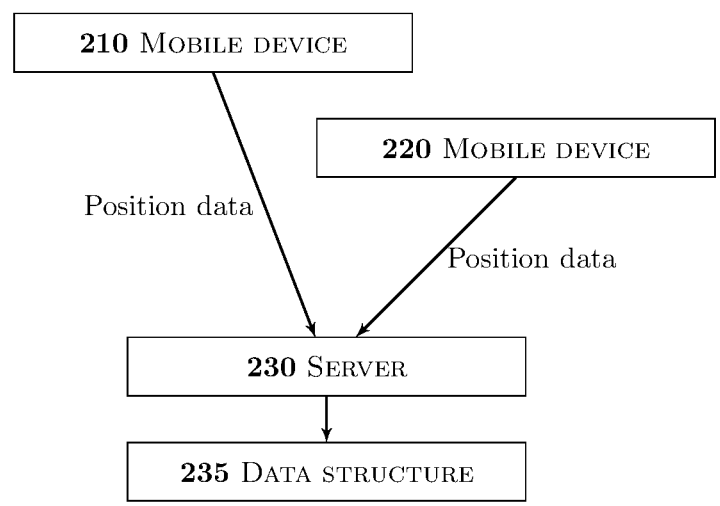
FIG. 2 illustrates a system according to embodiments of the invention.

FIG. 2 illustrates a sample system 200 for determining traffic data.

FIG. 2 illustrates two mobile devices 210 and 220 which transfer their positions to a server 230. The server 230 includes a data structure 235. For each of said positions, method is 100 is performed independently.

Figure 3:
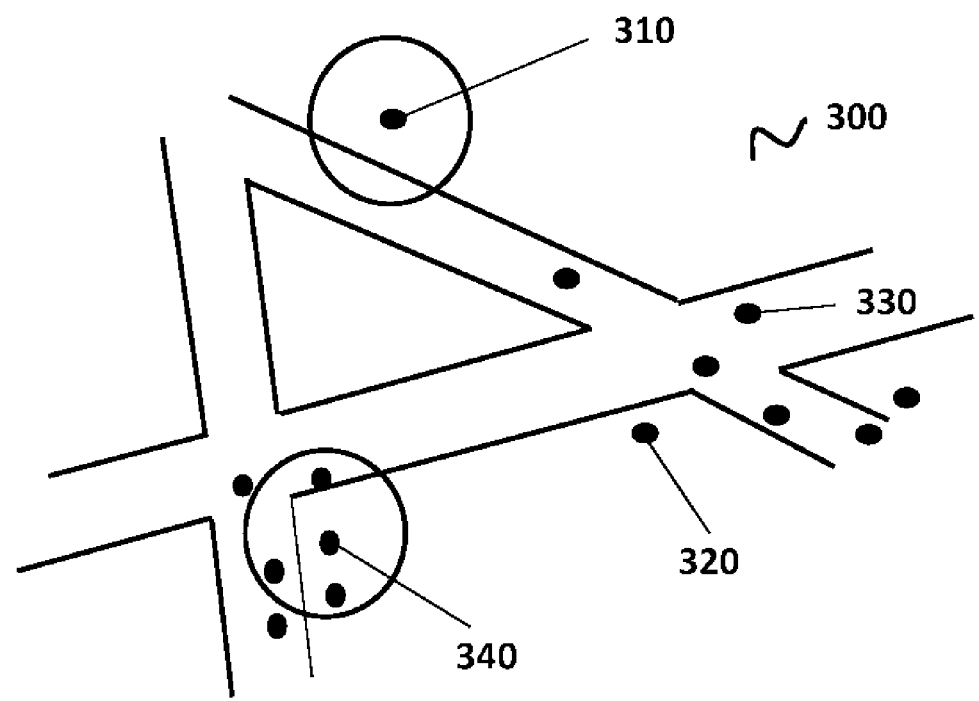
FIG. 3 illustrates an example traffic situation that may be detected and/or analyzed with embodiments of the invention.

FIG. 3 illustrates a sample traffic situation. Three street crossings are shown, as well as multiple mobile devices 310, 320, 330, and 340. The mobile devices may correspond to different road users. Accordingly, device 310 represents a cyclist with a smart phone, devices 320 and 330 represent vehicles, and device 340 represents a pedestrian. In method 100 or system 200, respectively, types of road users may be transferred to a server. In certain embodiments, the type of a road user may also be determined at the server, such as based on a position beyond a street but on a sideway, or based on a transferred velocity in combination with a position. For example, a velocity of 6 km/h and a position on a sideway may refer to a pedestrian, whereas a velocity of 50 km/h on a street may be interpreted as vehicle.

The illustrated mobile devices may transfer position data and optionally directional or velocity data to a server, and method 100 may be performed for each such transfer.

Based on the received data, a global analysis of the traffic situation may be conducted. If data are received from all illustrated mobile devices, a maximum analysis may be conducted on a two-dimensional data structure which represents a grid over the illustrated traffic situation, the fields of which include the illustrated road users. Such a maximum analysis may determine a maximum in an area of mobile device 340 for the point of time illustrated in FIG. 3, because three more road users are present within a predefined perimeter around this device. Particular advantages are provided by a maximum analysis that compares numbers of road users, as was detailed above.

In further embodiments, the same traffic situation may be tracked over a duration of time, wherein the entire data structure is stored at given time intervals. In response to a request, all data structures may be united into a three-dimensional data structure, such as into a three-dimensional array, and a time may be determined at which the greatest number of road users was acquired. Alternatively, a determination may be made at which points the greatest number of road users were present over the time period. As a further alternative, a determination may be made at which location road users were present with the highest velocities. Further, a determination may be made at which daytimes or weekdays/months/years the greatest or, alternatively, the lowest number of road users were present at certain predefined locations.

The invention thereby accomplishes creating a full analysis of traffic situations. At the same time, the invention accomplishes issuing warnings to individual road users approaching a difficult traffic situation, such as a location that is frequently visited by vehicles with excessive speed. One particular advantage of the invention is that the road users do not need to be identified, but remain anonymous; an IP or similar data are not required in order to apply the invention. Furthermore, the invention may be applied to arbitrary infrastructures without requiring adaptation, if these are capable of reliable transfer of geographic data to a server. Further advantages and embodiments may be apparent from the appended claims.

The invention claimed is:

1. A method, comprising:
 receiving position data from a mobile device transported by a road user;
 receiving information on a type of means of transportation associated with the mobile device;
 incrementing a counter variable associated with a predefined geographic area that includes a position of the position data, said counter variable representing the number of road users who are present in said geographical area;
 incrementing a counter variable further comprising incrementing a counter variable for said type of means of transportation;
 initializing a time variable, said time variable set to a predefined value and decremented continuously;
 decrementing said counter variable in response to expiration of said time variable; and
 providing the road user with traffic data for a geographical area based on said variables.

2. The method of claim 1 further comprising receiving a request from a second mobile device and transferring one or more counter variables in a predefined geographic area that includes the position of the second mobile device.

3. The method of claim 1 wherein the predefined value is an expected value defining an average length of stay of the mobile device in the predetermined geographic area for a type of means of transportation, said type associated with the mobile device.

4. A system, comprising:
 one or more mobile devices transported by one or more road users; and
 a server;
 wherein the server is adapted to receive position data from the one or more mobile devices, to receive information on types of means of transportation associated with the mobile devices, to increment a counter variable associated with a predefined geographic area that includes a position of the position data, said counter variable representing the number of road users who are present in said geographical area, wherein incrementing a counter variable further comprises incrementing a respective counter variable for the type of means of transportation, and to initialize a time variable, said time variable set to a predefined value and decremented continuously, said server further adapted to decrement said counter variable in response to expiration of said time variable.

5. The system of claim 4 wherein the server is further adapted to store one or more counter variables and time variables for each geographic area that includes a received position.

6. The system of claim 4 wherein said server is further adapted to receive a request from a mobile device and to determine one or more counter variables in a predefined geographic area that includes the position of the mobile device.

7. The system of claim 4 wherein the predefined value is an expected value that defines an average length of stay of a mobile device in the predefined geographic area for a type of means of transportation.

* * * * *